United States Patent
Lowry et al.

(10) Patent No.: US 10,638,029 B2
(45) Date of Patent: Apr. 28, 2020

(54) SHARED EXPERIENCES IN PANORAMIC VIDEO

(71) Applicant: C360 Technologies, Inc., Wexford, PA (US)

(72) Inventors: Brian C. Lowry, Emlenton, PA (US); Joseph B. Tomko, Wexford, PA (US); Evan A. Wimer, Pittsburgh, PA (US)

(73) Assignee: C360 Technologies, Inc., Wexford, PA (US)

( * ) Notice: Subject to any disclaimer, the term of this patent is extended or adjusted under 35 U.S.C. 154(b) by 0 days.

(21) Appl. No.: 16/085,697

(22) PCT Filed: Mar. 17, 2017

(86) PCT No.: PCT/US2017/022991
§ 371 (c)(1),
(2) Date: Sep. 17, 2018

(87) PCT Pub. No.: WO2017/161287
PCT Pub. Date: Sep. 21, 2017

(65) Prior Publication Data
US 2019/0075232 A1 Mar. 7, 2019

Related U.S. Application Data

(60) Provisional application No. 62/310,244, filed on Mar. 18, 2016.

(51) Int. Cl.
*G01S 3/74* (2006.01)
*G06F 3/0484* (2013.01)
(Continued)

(52) U.S. Cl.
CPC .......... *H04N 5/23206* (2013.01); *G01S 3/04* (2013.01); *G01S 3/043* (2013.01); *G06F 3/011* (2013.01);
(Continued)

(58) Field of Classification Search
CPC .......... H04N 5/23206; H04N 21/8456; H04N 21/21805; H04N 21/816; H04N 5/23238;
(Continued)

(56) References Cited

U.S. PATENT DOCUMENTS 4,656,506 A * 4/1987 Ritchey .................. G03B 21/00
348/39
7,796,155 B1 * 9/2010 Neely, III .......... G06K 9/00771
345/418
(Continued)

FOREIGN PATENT DOCUMENTS

JP WO 2016002445 * 9/2015
WO WO 2013/126784 A2 * 2/2013
WO 2016002445 A1 1/2016

OTHER PUBLICATIONS

International Search Report for PCT Application PCT/US2017/022991, dated May 12, 2017, 2 pages.
(Continued)

*Primary Examiner* — Philip P. Dang
(74) *Attorney, Agent, or Firm* — Ference & Associates LLC

(57) ABSTRACT

One embodiment provides a method, including: receiving, using a camera, at least one panoramic video; determining, using an electronic device, a spatial location in the panoramic video associated with a selection by at least one viewer; obtaining, at the electronic device, a request by the at least one viewer to share the spatial location with at least one other viewer; and sending, using the electronic device, information associated with the spatial location to the at least one other viewer. Other aspects are described and claimed.

14 Claims, 6 Drawing Sheets

(51) Int. Cl.
*H04N 5/232* (2006.01)
*H04N 21/218* (2011.01)
*G01S 3/04* (2006.01)
*G06F 3/01* (2006.01)
*G06F 3/0481* (2013.01)
*H04N 21/81* (2011.01)
*H04N 21/845* (2011.01)

(52) U.S. Cl.
CPC ..... *G06F 3/04815* (2013.01); *H04N 5/23238* (2013.01); *H04N 21/21805* (2013.01); *H04N 21/816* (2013.01); *H04N 21/8456* (2013.01)

(58) Field of Classification Search
CPC ...... G06F 3/04815; G06F 3/011; G01S 3/043; G01S 3/04
See application file for complete search history.

(56) References Cited

U.S. PATENT DOCUMENTS

| | | | | |
|---|---|---|---|---|
| 9,113,068 | B1* | 8/2015 | Whitson | H04N 5/23206 |
| 9,588,215 | B1* | 3/2017 | Lowry | H04N 5/23238 |
| 9,699,375 | B2* | 7/2017 | Fan | H04N 5/23229 |
| 9,917,870 | B2* | 3/2018 | Barnett | H04L 65/601 |
| 9,992,502 | B2* | 6/2018 | Abbas | H04N 19/146 |
| 10,015,527 | B1* | 7/2018 | Banta | H04N 5/2628 |
| 10,094,903 | B2* | 10/2018 | Lowry | H04N 5/23238 |
| 10,334,158 | B2* | 6/2019 | Gove | G06T 1/0007 |
| 2002/0083473 | A1* | 6/2002 | Agnihotri | G11B 27/105 725/140 |
| 2004/0183918 | A1 | 9/2004 | Squilla et al. | |
| 2014/0300775 | A1* | 10/2014 | Fan | H04N 5/23229 348/231.3 |
| 2014/0344853 | A1 | 11/2014 | Maruyama et al. | |
| 2015/0062287 | A1* | 3/2015 | Reinhardt | H04N 21/23418 348/36 |
| 2015/0095355 | A1* | 4/2015 | Patton | G06F 16/29 707/754 |
| 2015/0287246 | A1 | 10/2015 | Huston et al. | |
| 2016/0127641 | A1 | 5/2016 | Gove | |
| 2016/0173775 | A1 | 6/2016 | Lowry et al. | |
| 2016/0191798 | A1 | 6/2016 | Yoo et al. | |
| 2018/0032997 | A1* | 2/2018 | Gordon | G06Q 20/3224 |
| 2018/0262684 | A1* | 9/2018 | Lowry | G01S 3/04 |

OTHER PUBLICATIONS

International Preliminary Report on Patentability for PCT Application PCT/US2017/022991, dated Sep. 18, 2018, 8 pages.
Extended Search Report for European Application No. EP17761643, dated Jan. 22, 2019, 3 pages.
Written Opinion for European Application No. EP17767643, dated Feb. 12, 2019, 7 pages.

* cited by examiner

A. CYLINDRICAL

B. SPHERICAL

SHARED EXPERIENCES IN PANORAMIC VIDEO

CLAIM FOR PRIORITY

This application claims priority to U.S. Provisional Application No. 62/310,244, filed on Mar. 18, 2016, the contents of which are fully incorporated by reference herein.

BACKGROUND

Virtual reality (VR) and augmented reality (AR) are quickly growing in acceptance and popularity, accelerated by Facebook Inc.'s purchase of OCULUS RIFT® (Registered trademark of Facebook, Inc.) in 2014. End users are using their mobile devices as "second screens" simultaneously interacting with the device while at the same time watching the broadcast on their television set. As VR/AR headsets improve, many users will transition to these devices because of the compelling immersive nature. For example, while watching a NASCAR® (A registered trademark of National Association of Stock Car Auto Racing, Inc.) race on broadcast or cable television, the user may simultaneously watch an "in car" stream on their mobile or VR device. While such experiences are intrinsically personal in nature, there is a need to promote a communal aspect of the experience the ability to share one's view with others—and vice versa.

Social media and experiences are now ingrained in our culture, both domestically and internationally. We communicate via FACEBOOK® (A registered trademark of Facebook, Inc.), we search for restaurants "socially" via YELP!® (a registered trademark of Yelp! Inc.), share hobby interests via PINTEREST® (a registered trademark of Pinterest, Inc.), and share photographs via INSTAGRAM® registered trademark of Instagram, Inc.), etc., to name a few examples. As social media outlets evolve, so do the advertising paradigms that support them, Click-troughs and pop-up ads, while adequate for two-dimensional browsing, are inadequate and out of place for immersive panoramic environments. The advertising industry is seeking platforms and technologies that mesh with such environments. What is needed in the industry is the ability to combine the social aspects of social media, the experiential element of virtual or augmented reality, with the live or on-demand streaming of a sports or entertainment event.

BRIEF SUMMARY

In summary, one aspect provides a method, comprising: receiving, at an electronic device, at least one panoramic video; determining, using the electronic device, a spatial location in the panoramic video associated with a selection by at least one viewer; obtaining, at the electronic device, a request by the at least one viewer to share the spatial location with at least one other viewer; and sending, using the electronic device, information associated with the spatial location to the at least one other viewer.

Another aspect provides an information handling device, comprising: a processor; a memory device that stores instructions executable by the processor to: receive at least one panoramic video; determine a spatial location in the panoramic video associated with a selection by at least one viewer; obtain a request by the at least one viewer to share the spatial location with at least one other viewer; and send information associated with the spatial location to at least one other viewer.

A further aspect provides a product, comprising: a storage device having code stored therewith, the code being executable by the processor and comprising: code that receives, at an electronic device, at least one panoramic video; code that determines, at the electronic device, a spatial location in the panoramic video associated with a selection by at least one viewer; code that obtains, at an electronic device, a request by the at least one viewer to share the spatial location with at least one other viewer; and code that sends, using the electronic device, information associated with the spatial location to the at least one other viewer.

The foregoing is a summary and thus may contain simplifications, generalizations, and omissions of detail; consequently, those skilled in the art will appreciate that the summary is illustrative only and is not intended to be in any way limiting.

For a better understanding of embodiments, together with other and further features and advantages thereof, reference is made to the following description, taken in conjunction with the accompanying drawings, and the scope of the invention will be pointed out in the appended claims.

DETAILED DESCRIPTION

Figure 1:
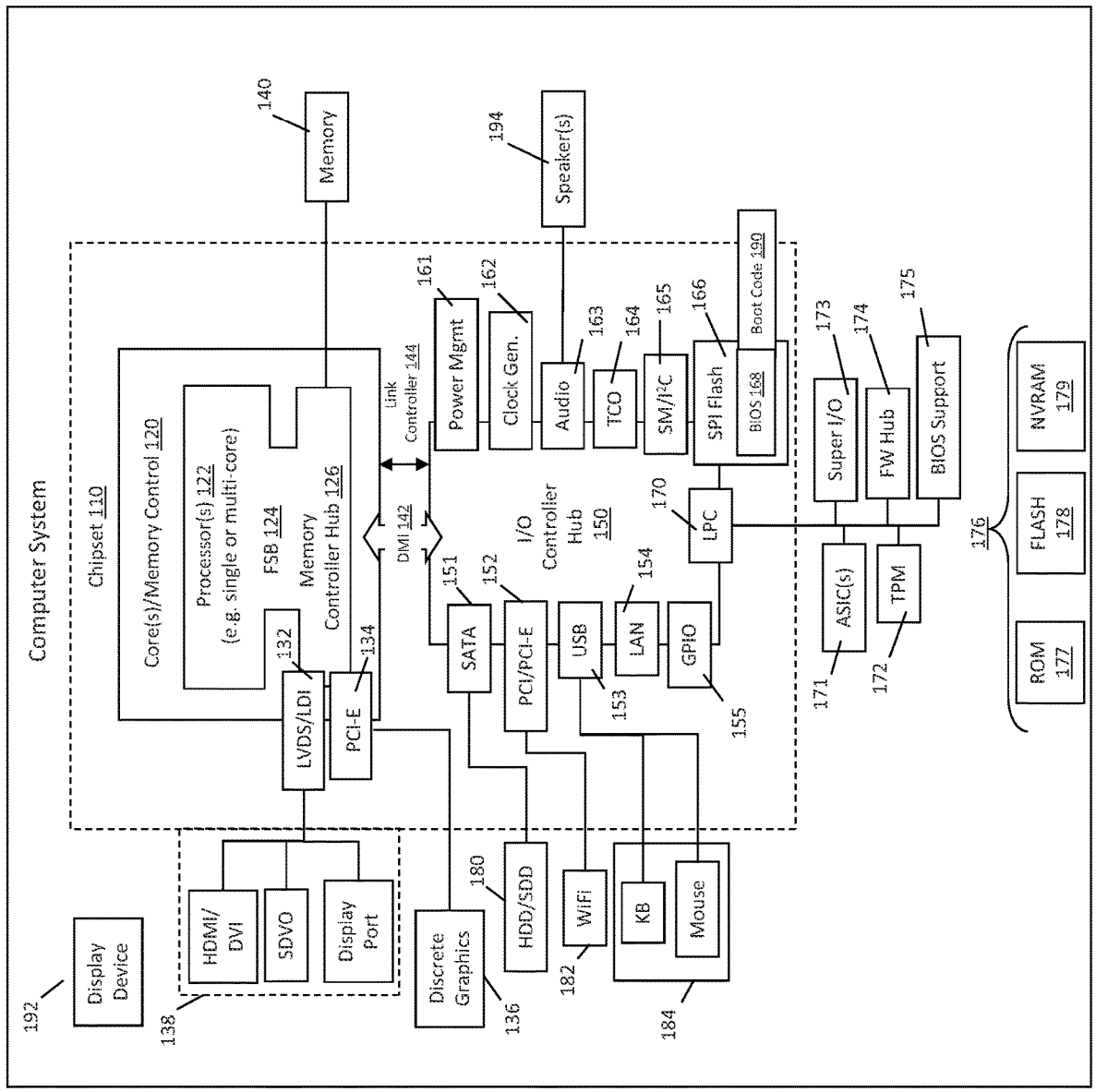
FIG. 1 illustrates an example information-handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments describe systems and methods for sharing a user's unique pan, tilt, and zoom, as well as comments and other relevant information payloads, with other users experiencing the same or different 360° panoramic experiences and events, both in real time as well as playback.

Embodiments describe a system that provides both a communal (social network-type) experience for participants and provides a one-to-one platform for sponsors and advertisers to promote their brands, create new revenue channels, and the like, due to the sophistication of the analytics.

A panoramic video environment is defined as a virtual experience, viewed on personal computers, mobile devices, virtual reality headsets or "goggles," "smart" televisions, etc., where the user views a panorama from a first person perspective relative to the camera that is capturing the video. The "view" may be a two-dimensional "portal" into the panoramic environment, or a stereoscopic view (three dimensional view). The panorama is typically 360° in one plane (azimuth), and varying from 50°-360° in the orthogonal plane (altitude). The user will typically have directional control in the view portal, including the ability to pan, tilt, and zoom from the perspective of the camera.

Embodiments describe that by aggregating the shared experiences of many users participating in 360° panoramic experiences and events, valuable temporal and spatial analytics may be gleaned. Non-limiting examples of such analytics include determining the most popular moments in an example event, what areas in the event arena did most users direct their attention, what views (i.e., pan, tilt, and zoom) were most popular among viewers during an event made available to users through 360° panoramic broadcast and/or streaming.

A technical improvement provided by an embodiment is that a plurality of users may remotely receive an IP stream comprising the entire space (i.e., race track, hockey arena, football stadium, basketball court, and the like) "seen" (i.e., capture, recorded) by a panoramic camera and at the same time remotely share with each other pan/tilt/zoom information from within that entire space that they have selected to share from their personal computing devices.

Another technical improvement of an embodiment is that a first user may receive on their personal computing device an IP stream of a live event, may share pan/tilt/zoom information of that live event to a second user who is at the same time receiving the same IP stream such that the first user's information may be toggled by the second user to change the view on the second user's mobile computing device and thus allow the second user to see what the first user selected and shared.

Another technical improvement of an embodiment is that all of the shared view information may be analyzed and a spatial pictograph in 2D or 3D may be constructed showing the most favored views. Information about the most popular views may be determined and may then be used to place advertising into the recording of the IP streamed event such that the most favored views may include such advertising.

Another technical improvement of an embodiment is that any shared view information may be transmitted to a plurality of users and may be used to create histogram information that the users may see on their mobile computing devices. The histogram information may include links to the most popular shared views which when clicked will toggle the mobile computing device view to a shared view while the live IP stream is being received by the mobile computing device. That shared view may include advertising which may be included based upon the popularity of the view. The popularity of the view may be calculated while the live IP stream is being received such that the charges for advertising may be increased based upon the calculated popularity of the view.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 depicts a block diagram of one example of information handling device circuits, circuitry or components. The example depicted in FIG. 1 may correspond to computing systems sold by Lenovo Group Ltd., Hewlett-Packard Co., Dell Inc., and others, or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
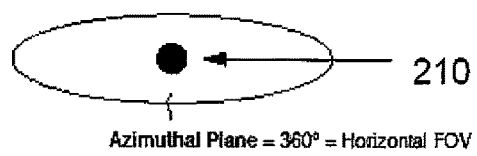
FIG. 2(A-B) illustrates example embodiments.
Figure 2:
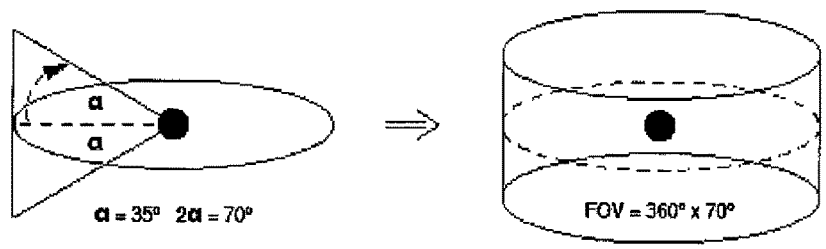
Figure 2:
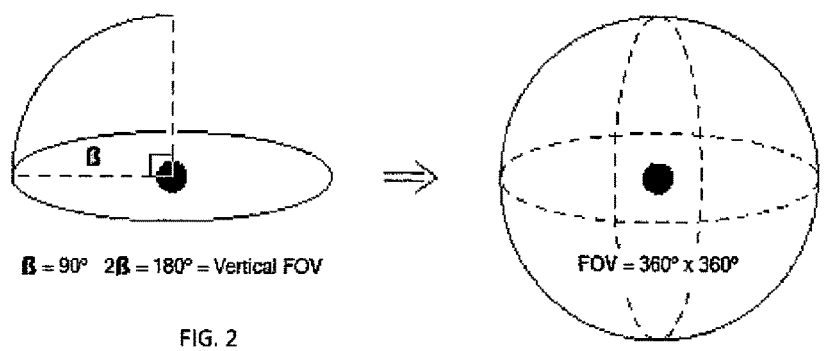

FIG. 2(A-B) depicts non-limiting example embodiments represented by various example panoramas (FIG. 2A and FIG. 2B). For each of these panoramas, a camera capable of capturing video in the space described is required. Embodiments describe at in order to capture video in a hemisphere, a camera 210 must be employed that has a Field of View (FOV) of 360°×180°. In one non-limiting example, embodiments describe using a JAI SP-20000C-CXP camera, available from JAI, Inc. of Jan Jose, Calif., USA, with an IMMERVISION® (a registered trademark of Canada Inc.) Panomorph Lens, available from immervision of Montreal, Quebec, Canada. The FOV is defined as the extent of the observable world, as "seen" from the camera. Embodiments describe that both a horizontal and vertical FOV are defined as Euclidean planar angles rather than a solid angle. In FIG. 2A, a cylindrical projection is made by sweeping out a vertical field of view (VFOV) of 70° over a 360° azimuthal angle. Similarly, the generation of a complete spherical projection is shown in FIG. 2B. Embodiments described that in order to capture a complete sphere, two hemispherical-capture cameras must be employed, or a multiplicity of smaller FOV cameras where a "stitching" process is used to combine the multiple videos into a single panorama.

Embodiments provide a stitching process to combine the video images from multiple sensors such as the example panoramic camera described above in order to form a single video image. Embodiments may use complex algorithms to ensure object alignment, as well as to mitigate the differences in sensor output. Embodiments describe that when stitching is performed in real-time, where frame rates can exceed 30 fps, the software for stitching would need to be implemented on a GPU, FPGA (Field Programmable Gate Array), optimized video DSP such as the Texas Instruments DaVinci Digital Media System-on-Chip, or on a ASIC (Application Specific integrated Circuit). This non-limiting example embodiment employs either a single sensor, single optic camera such as a JAI SP-20000C-CXP to produce a hemispherical panorama, or two such cameras "back-to-back" with a single stitch along the equator, yielding a complete spherical panorama. It will be appreciated that some embodiments may use conventional video cameras alone or in combination with other conventional video cameras or panoramic video cameras.

Figure 3:
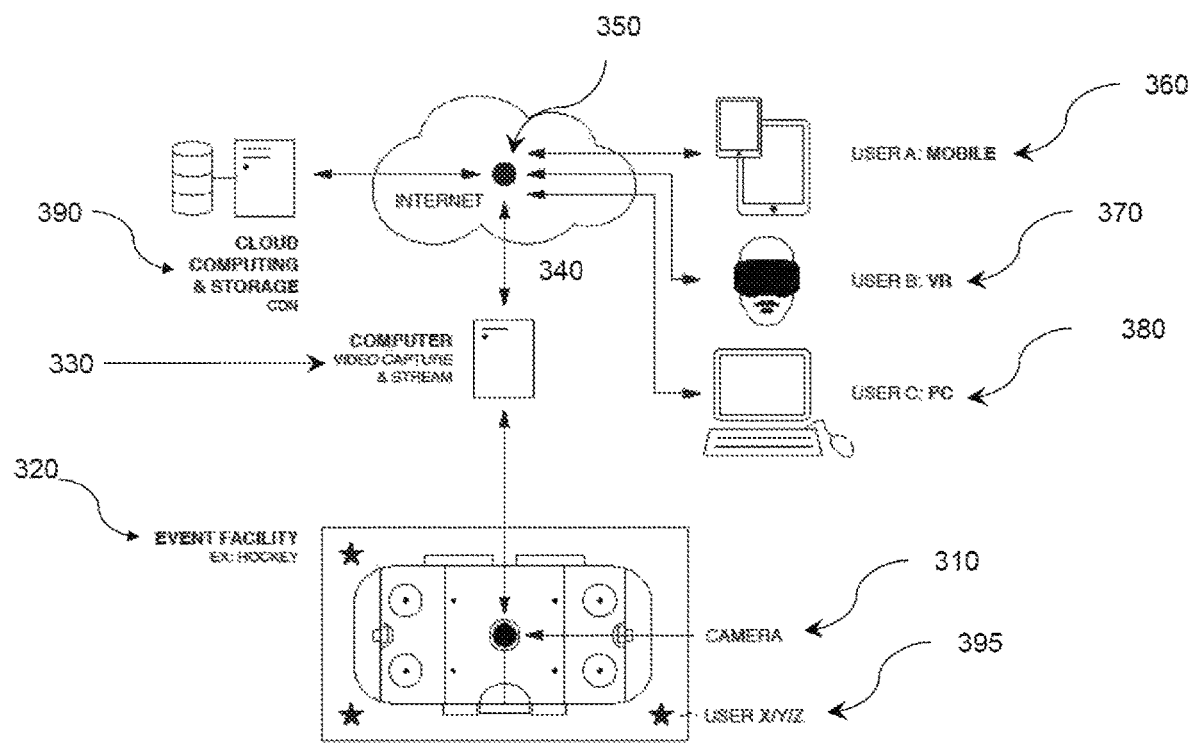
FIG. 3 illustrates an example embodiment.

FIG. 3 depicts an example embodiment. For this non-limiting example embodiment, the panoramic camera 310 is located directly under the scoreboard at center ice in a hockey arena (event facility). It will be appreciated that the camera 310 could be located at any desirable location and further, any event or event facility would be equally applicable to the embodiments described herein.

The camera 310 in the non-limiting example is capable of capturing a hemispherical panorama such that the entire arena space located at or below the level of the camera can be "seen." Embodiments provide that the camera 310 captures the entire hemisphere of the scene, via a computer 330, transmitting it to the web 350 via an encoded IP stream 340. It will be appreciated that in other embodiments multiple cameras and or cameras of different orientations may be utilized, in one non-limiting example, a camera might be located at the player's bench, facing out into the arena.

Returning to FIG. 3, in an embodiment camera optics focus the entire panorama as an ellipse on the camera CMOS (complementary metal-oxide-semiconductor), which is typically 4:3 or 16:9 in aspect ratio. The camera optics are designed to efficiently fill the CMOS area by adding optical distortion, which will be removed by a mathematical transformation of the image during playback. Most camera lenses are radially symmetric such that they image a circle onto the camera's CMOS. As noted, most CMOS sensors are not square, but rectangular, with common aspect ratios of 4:3 and 16:9. Obviously, the goal of the optics is to optimally fill the sensor area with light from the image/scene. Unlike a fisheye (radially symmetric) lens, the panomorph lens fills both the vertical and horizontal dimensions of the sensor. Also, the panormorph lens magnifies the portion of the image at the periphery of the lens and "stretches" (distorts) it, allowing those areas to be spread out across more sensor pixels resulting in more detail. The fisheye, too, has distortion, but it is linear from the optic axis to the periphery, whereas the panomorph lens is nonlinear. Thus, when we create pan/tilt/zoom views from our panorama, we need to "dewarp"—remove the distortion—imparted by the lens design—to accurately view a scene. One non-limiting example of a suitable lens is manufactured is the ImmerVision Panamorph Lens.

In an embodiment, as video frame images are formed on the camera CMOS, the frames are captured, debayered (demosaiced), and then encoded. Capturing is the process of "grabbing" frames in succession (e.g. 30 frames per second) from the camera via the communication link, then buffering them in memory such that they can be processed. Debayering (demosaicing) is the process of converting a RAW (grayscale camera) image and converting it to a color image. There are various algorithms for doing this, with the most complex producing the most accurate results at the expense of CPU/GPU processing time. Encoding is the process of packaging the image into a standard format while at the same time compressing the video frames such that they can be archived and/or transmitted with less bandwidth. When the vide frames are played back or received, they will be decoded. A "codec" (short for "compression-decompression") is the standard format by which the frames are processed. Common video codecs are H.264 and HEVS (H.265). This is typically a very compute-intensive process (i.e., demands a relatively large number of computations).

Embodiments permit these processing stages to be performed FPGA's, ASIC's, DSP's, or workstation-hosted GPU's. At least one non-limiting example embodiment uses H.264 and HEVC codecs for encoding. Thus, there are no losses in image information due to projection transformations, since there are no projection transformations. The only losses in image quality are those incurred during the encoding process. In an embodiment where a higher upload bandwidth is available, encoding losses may be lowered, while in locations where upload bandwidth is poor, the encoding losses may be higher. In an embodiment, a goal is to push the highest resolution video to the cloud as possible.

In the example embodiment in FIG. 3, the camera 310 is semi-permanently located at the event facility 320. It will be appreciated however, that a camera or cameras may be temporarily attached to trolleys on moveable cable systems, as is common in field sports, such as soccer and American football. Some embodiments use this method of temporarily attaching one or more cameras to moveable cable systems. However, embodiments contemplate any method or location of affixing one or more cameras in the desired location and venue.

In an embodiment a cloud server 390 intercepts the encoded IP stream 340, replicates the packets, and transmits each encoded IP video frame to as many users as request the image via their remote devices, whether mobile computing device 360 (used by User A), VR headset 370 (used by User B), or "smart" internet-enabled television or PC 380 (used by User C). In an embodiment a Content Distribution Network (CDN) replicates and propagates IP packets as required.

In an embodiment, it may be necessary for the CDN to replicate, transmit, and cache video frames for later retrieval. Users consuming the video stream may be physically present at the sporting event, or remotely located. In FIG. 3 those users physically present at the sporting event are labeled as Users X, Y, and Z (395), while those that are not physically present (i.e., remote) are labeled as Users A (shown in the example embodiment as using mobile computing device 360), B (shown in the example embodiment as using VR goggles 370), and C (shown in the example embodiment as using PC 380). All users may interact with the streamed IP video via a customized software application. Embodiments provide that such software may be run in a web browser, or may exist as an "app" that is custom-designed for a particular operating system (e.g., iOS, Android, Roku OS, and the like). For example, on a personal computer this application can run in a web browser environment. As another example, on platforms such as ANDROID and IOS, this application can be run as a standalone application with optimizations made for the respective platform. Support for VR headsets may be accomplished by off-axis projection or other algorithms suitable for stereoscopic image processing.

Figure 4:
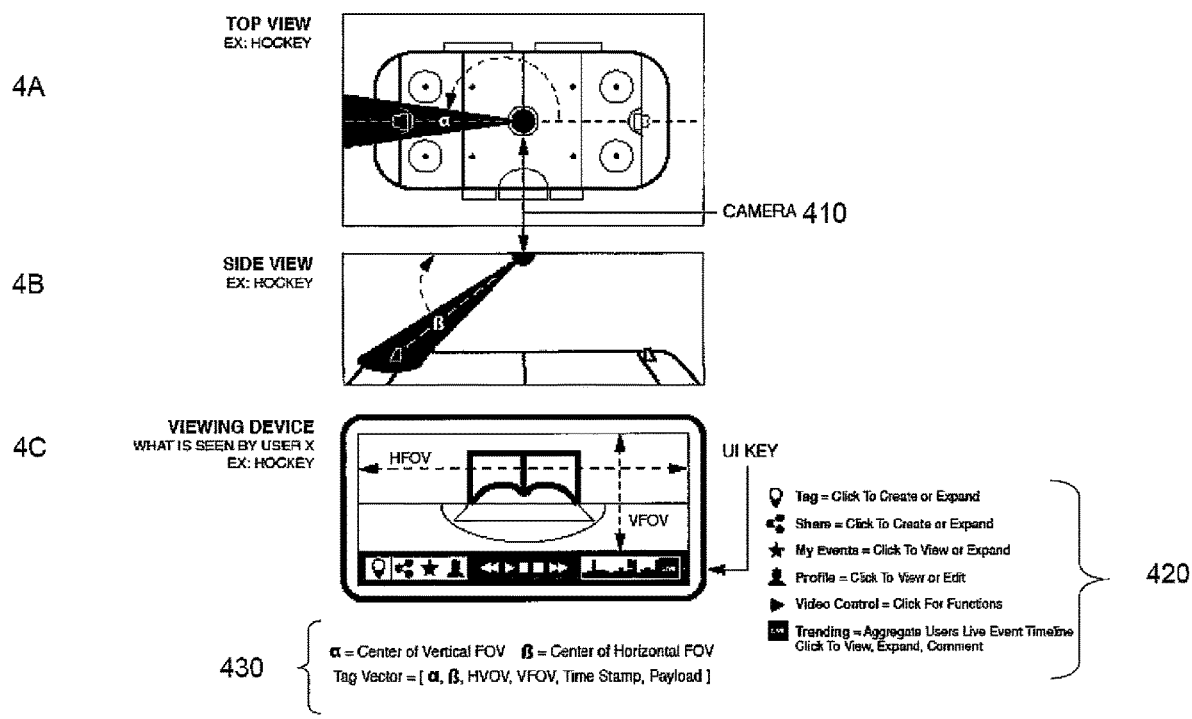
FIG. 4(A-C) illustrates example embodiments.

FIG. 4(A-C) depicts an example embodiment for creating ephemeral tags (or markers). In this non-limiting example, the panoramic camera 410 is located above a hockey arena and is capable of providing a FOV of 360×180°. FIG. 4A depicts a top view of the example hockey arena and the shaded area is the center of the vertical FOV. FIG. 4B depicts a side view of the example hockey arena and the shaded area is the center of the horizontal FOV.

Embodiments describe that User(s) X, Y, and/or Z (not shown in FIG. 4 but referenced in FIG. 3 and the corresponding description of FIG. 3) physically present at the event create tags on their devices. Devices might include a mobile computing device (i.e., mobile phone, tablet, lap top, VR goggles, and the like).

In one example embodiment User X might choose a view from the panoramic camera to "zoom in" for a close-up of the goalie in a hockey arena where the panoramic camera is located. FIG. 4C depicts the screen of User X's device. Embodiments describe that a user (like User X in our example embodiment) may navigate in the panorama via user interface 420 (UI) controls present on the mobile app running on User X's mobile computer device. Embodiments provide controls that may include the ability to virtually pan, tilt, and zoom. The effect of panning, tilting, and zooming essentially constrains the user's HFOV and VFOV to something less than or equal to the camera's HFOV and VFOV. In an embodiment, an unlimited number of users can simultaneously exercise this type of control. Each user is thus interacting with a portion of the entire panorama.

In an embodiment a shareable tag may be created, for example, by pressing a virtual user interface button on the mobile app. An example UI is shown at FIG. 4C in the lower right hand corner of User X's viewing device. Embodiments provide that, responsive to User X's input, the application running on User X's device immediately constructs a tag vector 430 which contains, but is not limited to, the user's horizontal FOV, vertical FOV, the center angles of each of the respective FOV's, a timestamp, and a payload which may contain event location, a URL, images, text, and the like. Embodiments provide that the tag vector 430 is associated with User X's tag. Embodiments provide that through the UI 420 User X can then elect to "share" the tag with others, adding comments, such as "What a save!" Embodiments provide multiple methods for uniquely characterizing a user's gaze direction. In an embodiment any of these methods are contemplated for creating a tag vector. In an embodiment, in situations where multiple cameras exist at a single venue (for example, the hockey rink in our non-limiting example), the tag vector 430 might also include camera dentification number, GPS location, and the like.

Embodiments provide that User(s) A, B, and/or C (also not shown in FIG. 4, but seen in FIG. 3 and described in the accompanying text and corresponding description) may likewise create ephemeral tags in the same manner, although such users are not physically present at the sporting event (for example, the hockey rink in our non-limiting example).

Embodiments provide that once tag vectors are created, they are pushed to the Consent Distribution Network (CDN), a system of distributed servers, (i.e., a network) that delivers content based upon geographic locations of the users, the server, and the content from where the video stream originated. Embodiments permit this event messaging to be accomplished with low latency communication frameworks such as WebRTC. It will be appreciated that any suitable event messaging may be used in accordance with this disclosure and other embodiments described herein.

Embodiments provide that tag vectors are aggregated and processed at the CDN. In an embodiment, periodically, Users' mobile apps (in the current non-limiting example, running on the devices of Users A, B, C, and X, Y, and Z) are asynchronously updated with a list of all shared tag vectors. In one non-limiting example, an update could be performed every five seconds. Thus, referring back to FIG. 4, in our non-limiting example, User B would "see" User X's "What a save!" tag less than 10 seconds from the time at which it was created. Embodiments provide the tag associated with the tag vector such that it appears as a UI feature on the app. In an embodiment, once the tag vector (created by User X in our non-limiting example) appeared as a UI feature on the app, User B could elect to "jump" to User X's tagged event. In an embodiment, this entails suspending viewing of the live video, then requesting the video from the cached cloud storage corresponding to the timestamp saved in User X's tag vector. In an embodiment the video associated with the tag vector is then pushed to User B's app for viewing. Once User B selects the tag associated with User X's tag vector, the tag vector re-orients User B's pan, tilt, and zoom (gaze direction) to those parameters saved in User X's tag vector, such that User B will "see" the event just as User X perceived it.

In an embodiment, once the ephemeral event playback is completed, User B's live stream resumes. In an embodiment the extent to which users can view past events (through tags associated with tag vectors) corresponds to the amount of video cached by the CDN. Embodiments provide that once the live event is finished (in this non-limiting example, the hockey game), users can continue to replay and tag events based upon the event being cached by the CDN. Embodiments provide that because every event can be watched repeatedly from a virtually endless number of perspectives, users will want to continue to "re-live" those experiences by replaying the tagged events.

Figure 5:
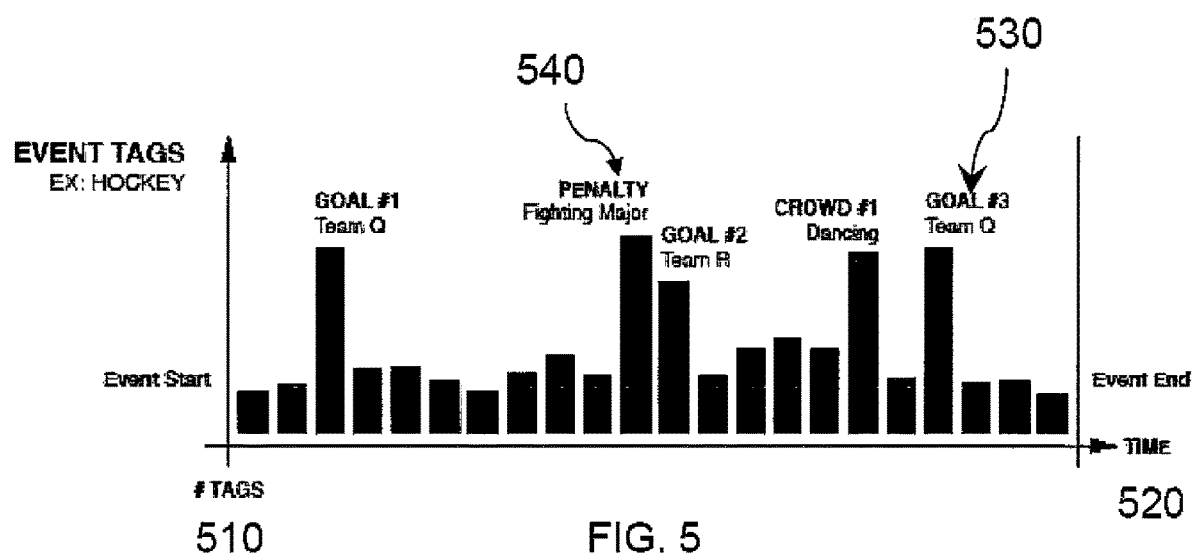
FIG. 5 illustrates an example embodiment.

Embodiments provide that frequency histograms might be constructed from the collected information. As non-limiting examples, such histograms might include the most frequently shared times and tags creating during a live event (such as our example hockey game). Turning to FIG. 5, depicted is a non-limiting example of various shared times throughout out the example hockey game. At 510, the vertical line is a scale moving from bottom to top indicating the number of times an event was tagged. At 520, the horizontal line is a scale moving from left to right indicating the time during which the event occurred. At 530, GOAL #3 by Team Q is shown as being tagged multiple times by various users. At 540, the PENALTY for Major Fighting occurred and was tagged by multiple users.

Embodiments provide that the feature showing the frequency histogram could be available on a User's application UI and might be used to facilitate "jumping" (by choosing to view the tagged event from an associated link in the histogram) to popular or trending events in the histogram. Embodiments provide that as tag vectors are aggregated for a live event, advertising and sponsorships might be triggered to appear based upon the frequency (i.e., trending events, user favorites, and the like), absolute time, or other desired metrics.

Embodiments provide that users might view and interact with several live and post live events concurrently. In one non-limiting example, User B might be remotely watching a hockey game at which User X is present, and User X could be remotely and simultaneously with the hockey game event be remotely watching a basketball game. Embodiments provide that User B could share an event (such as a spectacular shot) with User X who is attending a hockey game, thus allowing User X to "re-live" the moment witnessed, captured and tagged by User B. Embodiments provide that User X would be able to view the exact location, angle, distance, and the like that User B tagged.

In an embodiment, social web sites could be constructed showcasing tags from a wide range of sporting, cultural, entertainment events, and the like, all captured in panoramic video based upon the custom view chosen by a user. In an embodiment, advertisers might derive benefits from targeting the user demographics available. Embodiments permit use of any desirable and available demographics by advertisers to allow the advertisers to target their desired consumers.

Figure 6:
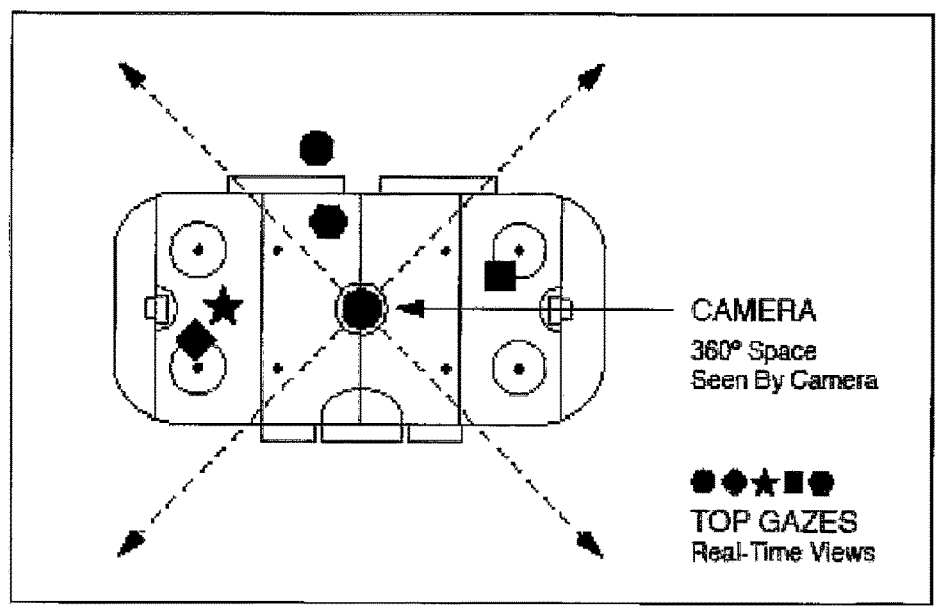
FIG. 6 illustrates an example embodiment.

FIG. 6 depicts another non-limiting example embodiment. Embodiments provide that a spatial pictograph in 2D or 3D may be constructed showing the most favored views. In this example embodiment, again at a hockey arena, the highest number of user views (gazes) were directed towards one of the team benches, as shown by the filled circle, followed by views of one of the goals (star and diamond), and so on such that each shape represents a view selected by multiple users. Embodiments provide that advertisers might use the information about the most user-selected views to place ads, either physically at the arena, or "virtually" as described in our previous patent application Ser. No. 62/205, 997 (Generating Objects in Real Time Panoramic Video) attached as an Appendix to U.S. Provisional Application No. 62/310,244, filed on Mar. 18, 2017, the contents of which are fully incorporated by reference herein and from which this applications claims priority).

While the various example embodiments have been described in connection with the examples provided herein, these were provided as non-limiting examples. Accordingly, embodiments play be used in similar contexts with similar devices and methods.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is a non-transitory storage medium, inclusive of all storage media other than signal or propagating media.

Program code embodied on a storage medium may be transmitted using any appropriate medium, including hut not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an electronic device, at least one panoramic video of a panoramic video environment;
   determining, using the electronic device, a spatial location in the panoramic video associated with a selection by at least one viewer, wherein the selection comprises a view within the panoramic video the at least one viewer is currently viewing and the spatial location comprises pan, tilt, and zoom information associated with the view;
   obtaining, at the electronic device, a request by the at least one viewer to share the spatial location with at least one other viewer;
   sending, using the electronic device, information associated with the spatial location to the at least one other viewer;
   aggregating obtained requests from a plurality of viewers, wherein the obtained requests comprise a temporal location identifying a time in the panoramic video associated with the obtained requests;
   determining a popular spatial location by analyzing the aggregated obtained requests to identify a spatial location having a number of viewer selections exceeding a predetermined threshold; and
   determining a popular temporal location by analyzing the aggregated obtained requests to identify a time in the panoramic video having a number of viewer selections exceeding a predetermined threshold.

2. The method of claim 1, wherein the spatial location comprises coordinates, wherein the coordinates comprise pan, tilt, and zoom.

3. The method of claim 2, wherein the determining a spatial location comprises identifying the coordinates of the selection by at least one viewer.

4. The method of claim 2, wherein the sending comprises sending the coordinates to the at least one other viewer and adjusting a view of the at least one other viewer to match the sent coordinates.

5. The method of claim 1, wherein the request further comprises comments by the at least one viewer and wherein the sent information further comprises the comments.

6. The method of claim 1, further comprising generating a tag associated with the spatial location.

7. The method of claim 6, wherein the sending information comprises sending the generated tag.

8. An information handling device, comprising:
   a processor;
   a memory device that stores instructions executable by the processor to:
   receive at least one panoramic video of a panoramic video environment;
   determine a spatial location in the panoramic video associated with a selection by at least one viewer, wherein the selection comprises a view within the panoramic video the at least one viewer is currently viewing and the spatial location comprises pan, tilt, and zoom information associated with the view;
   obtain a request by the at least one viewer to share the spatial location with at least one other viewer;
   send information associated with the spatial location to the at least one other viewer;
   aggregate obtained requests from a plurality of viewers, wherein the obtained requests comprise a temporal location identifying a time in the panoramic video associated with the obtained requests;
   determine a popular spatial location by analyzing the aggregated obtained requests to identify a spatial location having a number of viewer selections exceeding a predetermined threshold; and
   determine a popular temporal location by analyzing the aggregated obtained requests to identify a time in the panoramic video having a number of viewer selections exceeding a predetermined threshold.

9. The information handling device of claim 8, wherein the spatial location comprises coordinates, wherein the coordinates comprise pan, tilt, and zoom.

10. The information handling device of claim 9, wherein the determining a spatial location comprises identifying the coordinates of the selection by at least one viewer.

11. The information handling device of claim 9, wherein the sending comprises sending the coordinates to the at least one other viewer and adjusting a view of the at least one other viewer to match the sent coordinates.

12. The information handling device of claim 8, wherein the request further comprises comments by the at least one viewer and wherein the sent information further comprises the comments.

13. The information handling device of claim 8, further comprising generating a tag associated with the spatial location.

14. A product, comprising:
   a non-transitory storage device having code stored therewith, the code being executable by the processor and comprising:

code that receives, at an electronic device, at least one panoramic video of a panoramic video environment;

code that determines, at the electronic device, a spatial location in the panoramic video associated with a selection by at least one viewer, wherein the selection comprises a view within the panoramic video the at least one viewer is currently viewing and the spatial location comprises pan, tilt, and zoom information associated with the view;

code that obtains, at the electronic device, a request by the at least one viewer to share the spatial location with at least one other viewer;

code that sends, using the electronic device, information associated with the spatial location to the at least one other viewer;

code that aggregates obtained requests from a plurality of viewers, wherein the obtained requests comprise a temporal location identifying a time in the panoramic video associated with the obtained requests;

code that determines a popular spatial location by analyzing the aggregated obtained requests to identify a spatial location having a number of viewer selections exceeding a predetermined threshold; and code that determines a popular temporal location by analyzing the aggregated obtained requests to identify a time in the panoramic video having a number of viewer selections exceeding a predetermined threshold.

* * * * *